United States Patent
Husted et al.

(10) Patent No.: US 7,098,821 B2
(45) Date of Patent: Aug. 29, 2006

(54) RECEIVING AND TRANSMITTING SIGNALS HAVING MULTIPLE MODULATION TYPES USING SEQUENCING INTERPOLATOR

(75) Inventors: Paul J. Husted, Palo Alto, CA (US); Tao-Fei Samuel Ng, Fremont, CA (US)

(73) Assignee: Atheros Communications, Inc., Santa Clara, CA (US)

( * ) Notice: Subject to any disclaimer, the term of this patent is extended or adjusted under 35 U.S.C. 154(b) by 371 days.

(21) Appl. No.: 10/367,527

(22) Filed: Feb. 14, 2003

(65) Prior Publication Data

US 2004/0160346 A1    Aug. 19, 2004

(51) Int. Cl.
*H03M 7/00*    (2006.01)
(52) U.S. Cl. .......................... 341/61; 370/201
(58) Field of Classification Search .............. 341/61; 370/201, 503; 348/708; 708/313
See application file for complete search history.

(56) References Cited

U.S. PATENT DOCUMENTS

| | | | |
|---|---|---|---|
| 4,460,890 A | | 7/1984 | Busby |
| 4,568,965 A | * | 2/1986 | Powers ..................... 348/708 |
| 4,866,647 A | * | 9/1989 | Farrow ..................... 708/313 |
| 5,647,008 A | * | 7/1997 | Farhangi et al. ............ 381/119 |
| 6,404,357 B1 | | 6/2002 | Taunton |
| 2003/0012302 A1 | | 1/2003 | Webster et al. |
| 2004/0117764 A1 | | 6/2004 | Sinha et al. |
| 2004/0152418 A1 | | 8/2004 | Sinha et al. |

OTHER PUBLICATIONS

Vesma et al.; "The Effects Of Quantizing The Fractional Interval In Interpolation Filters"; Tampere University of Technology; Tampere, Finland; 4 pages, date unknown.
Meyr et al.; "Digital Communication Receivers"; A Wiley-Interscience Publication; John Wiley & Sons Inc.; pp. 505-513, date unknown.
Willson Jr.; "A Programmable Interpolation Filter For Digital Communications Applications"; University of California, Los Angeles, CA; Final Report 1996-97 for MICRO Project 96-149.

* cited by examiner

*Primary Examiner*—Peguy JeanPierre
*Assistant Examiner*—Joseph Lauture
(74) *Attorney, Agent, or Firm*—Bever, Hoffman & Harms, LLP; Jeanette S. Harms

(57) ABSTRACT

In a wireless local area network (WLAN), receiving or transmitting signals having multiple modulation schemes can require the use of multiple clock rates. Providing these multiple clock rates significantly increases silicon area and power consumption, both of which are highly undesirably in a wireless device. A sequencing interpolator can advantageously reduce the number of clock rates by receiving signals at a first rate and outputting signals at a second rate. The sequencing interpolator can include a multiplexer network that selectively determines which coefficients are applied to certain signals. Coefficients are chosen to ensure that an error in a frequency domain is within a given tolerance. The multiplexer network can be controlled by a counter value. At a predetermined count, the interpolated output signal is discarded and the counter is reset.

26 Claims, 8 Drawing Sheets

RECEIVING AND TRANSMITTING SIGNALS HAVING MULTIPLE MODULATION TYPES USING SEQUENCING INTERPOLATOR

BACKGROUND OF THE INVENTION

1. Field of the Invention

The present invention relates to a wireless local area network (WLAN) device that can receive and transmit signals of multiple modulation types. In particular, the present invention relates to a sequencing interpolator that can provide a rational ratio (integer/integer) interpolation for signals of a predetermined modulation type, thereby reducing the number of phase locked loops (PLLs) to be used in the WLAN device.

2. Description of the Related Art

Wireless local area networks (WLANs) are becoming increasingly popular as communication networks. The IEEE 802.11 standards provide guidelines for the operation of devices operating in WLANs. Specifically, the 802.11a standard defines communication in the 5 GHz band using data rates of 6, 12, 18, 24, 36, and 54 Mbps. The 802.11b standard defines communication in the 2.4 GHz band using data rates of 1, 2, 5.5, and 11 Mbps. A recent proposed addition to the 802.11 standards, called the 802.11g standard, uses the high data rates of 802.11a in the frequency band of 802.11b, i.e. 2.4 GHz.

The 802.11g standard envisions that 802.11b devices can communicate with 802.11g devices that operate in the same WLAN, irrespective of communication mode. In an infrastructure communication mode, clients communicate with each other through an access point. In other words, an access point functions as a communication hub between its associated clients. In contrast, in an ad hoc communication mode, clients can communicate with each other directly. As used herein, the term "device" can refer to either an access point or a client.

To ensure backwards compatibility with 802.11b devices while allowing data rate increases, the 802.11g standard incorporates the modulation schemes from both the 802.11a and 802.11b standards. In general, modulation refers to the addition of information to a carrier. Typical modulation techniques include frequency modulation wherein the frequency of the carrier waveform is varied. The 802.11b standard uses a modulation scheme called complementary code keying (CCK) whereas the 802.11a standard uses another modulation scheme called orthogonal frequency division multiplexing (OFDM). Both CCK and OFDM provide distinctive frequency modulation aspects.

The 802.11g standard, although providing guidelines for compatibility, allows the dual modulation schemes to be implemented in a proprietary manner. Thus, some WLAN device providers could use redundant components to ensure that signals received or transmitted using CCK or OFDM modulation can be correctly interpreted and reconstructed. However, this redundancy undesirably increases the cost and power consumption of the network. Therefore, a need arises for a method of efficiently reducing component redundancy and power in a WLAN device (access point and/or client) operating in accordance with the 802.11g standard.

SUMMARY OF THE INVENTION

In a wireless local area network (WLAN), receiving or transmitting signals having multiple modulation schemes can require the use of multiple clock rates. Typically, each clock rate would be provided by a phase locked loop (PLL). Therefore, in a conventional WLAN device, multiple PLLs are needed. Unfortunately, these PLLs significantly increase silicon area and power consumption, both of which are highly undesirably in a wireless device.

In accordance with one aspect of the invention, a single phase-locked loop (PLL) can be used in the WLAN device that is operating in a multi-modulation scheme, e.g. 802.11g, mode. In one embodiment, the PLL can be run at a multiple of 11 MHz, e.g. 176 MHz. Thus, components in the WLAN device can run at any multiple of 11 MHz from this PLL. One modulation scheme included in the 802.11 mode, called OFDM, requires the use of 40 MHz to reconstruct its modulated signals. In this case, a sequencing interpolator can receive signals at 44 MHz inputs and advantageously output signals at 40 MHz, thereby eliminating the need to add another PLL.

The sequencing interpolator can conceptually be thought of as a plurality of interpolators, wherein each interpolator applies certain coefficients to the received signals, i.e. samples. A minimum-mean squared error (MMSE) technique can be used to determine the coefficients for the interpolators. The coefficients can be chosen to ensure that an error in a frequency domain is within a given tolerance. In this manner, the total error for the interpolators in the frequency domain within the passband is assured to be within a given tolerance. The interpolators can be used in a predetermined sequence based on a counter value, called a count. At a predetermined count, an interpolated output sample is discarded (if the output rate is less than the input rate) or added (if the input rate is less than the output rate) and the counter is reset.

In one embodiment, the plurality of interpolators can be implemented with a single interpolator that has multiple interpolator stages. Each configuration of the sequencing interpolator during a count is an interpolator stage. The sequencing interpolator can include a tap delay line, a multiplier network, a multiplexer network, and a summation block. The tap delay line stores N samples, wherein N can be selected based on a desired signal to noise ratio (SNR). The multiplier network multiplies each of the samples by a coefficient. In accordance with one feature of the invention, the multiplexer network selectively determines which coefficient is applied to a sample. Because some coefficients can be used during different interpolator stages, the multiplexer network advantageously reduces the hardware necessary to implement the sequencing interpolator. In one embodiment, the multiplexer network can be controlled by a counter value. If the counter value reaches a predetermined value, then an output sample of the sequencing interpolator is discarded (if the output rate is less than the input rate) or added (if the input rate is less than the output rate). The summation block sums the products generated by the multiplier network.

In one embodiment, the multiplexer network and the multiplier network can be implemented by a multiplexed partial product network. The multiplexed partial product network can include predetermined sets of multiplexers. Each set of multiplexers receives a plurality of bit shift values based on one of the samples and provides its outputs to an adder. The adder then provides its output sum to the summation block. In this embodiment, all multiplexers can be controlled by the count.

A method of reducing non-linearities in adjacent output samples provided by a plurality of interpolators is also provided. In this method, a minimum-mean squared error (MMSE) technique can be used to choose predetermined coefficients for the plurality of interpolators. Predetermined sets of coefficients can be used for each delay.

A transmitter for a WLAN device is also provided. The transmitter can include means for receiving data samples at a first rate as well as a sequencing interpolator for receiving processed data samples from the means for receiving, converting the processed data samples to interpolated data samples at a second rate, and discarding or adding predetermined interpolated data samples at the second rate based on a count. The transmitter can further include means for selecting one of the processed data samples at the first frequency and the interpolated data samples at the second rate.

A receiver for a WLAN device is also provided. The receiver can include variable gain amplifiers, e.g. RF, IF, and baseband amplifiers, for amplifying input radio signals. Means for mixing the radio signals can be used to provide baseband frequencies in the receiver. Analog to digital converters (ADCs) can be used for receiving the baseband frequencies and outputting digital signals. A processing block can be used for selectively processing the digital signals based on their modulation type. If the modulation type does not conform with the clock rate, then the processing block can transform signals of the non-conforming clock rate into signals conforming to the clock rate. In this manner, the processing block and other components of the receiver can advantageously operate on a single clock rate. In one embodiment, the processing block includes the above-described sequencing interpolator. A decoder can be used for receiving outputs of the processing block and providing accurate reconstruction of the signals.

A transceiver for a WLAN device is also provided. The transceiver can include a receiver block and a transmitter block. The receiver block can receive system input signals at a first clock rate and provide output signals to one or more digital components of the transceiver at a second clock rate. The transmitter block can receive input signals from one or more digital components of the transceiver at the second clock rate and provide system output signals at the first clock rate. Of importance, the receiver block and the transmitter block can share a sequencing interpolator that converts the first clock rate to the second clock rate and vice versa.

DETAILED DESCRIPTION OF THE FIGURES

A WLAN device uses a phase locked loop (PLL) to "lock on", i.e. maintain, a base clock rate for operating digital components in the device. A PLL generally runs at integer multiples of the desired clock rates for the digital components. (Note that the PLL can run at only one of these rates at any point in time.) However, if a non-integer multiple of a desired clock rate is needed, then multiple PLLs are typically provided in the WLAN device.

For example, in 802.11g WLAN devices, digital components for analyzing CCK packets require a fundamental clock rate of 11 MHz, whereas digital components for analyzing OFDM packets require a fundamental clock rate of 40 MHz. Thus, because 40 is not an integer multiple of 11, different PLLs would typically be provided for generating 11 MHz and 40 MHz, thereby ensuring that both CCK as well as OFDM packets in the 802.11g WLAN device could be accurately reconstructed. However, using this solution, the area on an integrated circuit (IC) associated with such PLLs as well as the power to operate multiple PLLs would undesirably increase.

Therefore, in accordance with one feature of the invention, a sequencing interpolation filter (also called a sequencing interpolator) can be used. With this sequencing interpolator, the number of PLLs needed on the 802.11g WLAN device can be significantly reduced. For example, only one PLL, not two PLLs, would be needed to allow accurate reconstruction of both CCK as well as OFDM packets. In this manner, the sequencing interpolator advantageously minimizes silicon area as well as lowers power consumption in the 802.11g WLAN device.

In one embodiment for an 802.11g device, the PLL can run at an integer multiple of 11 MHz, e.g. 176 MHz, which can be divided as necessary for the digital components on the device. Thus, in this case, the sampling of the CCK packets can be performed at 11 MHz. Advantageously, the sequencing interpolator can provide a plurality of unique delays so that, for example, received OFDM packets at 44 MHz (e.g. a simple 4× division of 176 MHz) can be sampled at 40 MHz (i.e. the desired rate). Moreover, as another advantage, the sequencing interpolator can provide this function using lower power than a conventional non-integer fractional rate interpolator.

Figure 1:
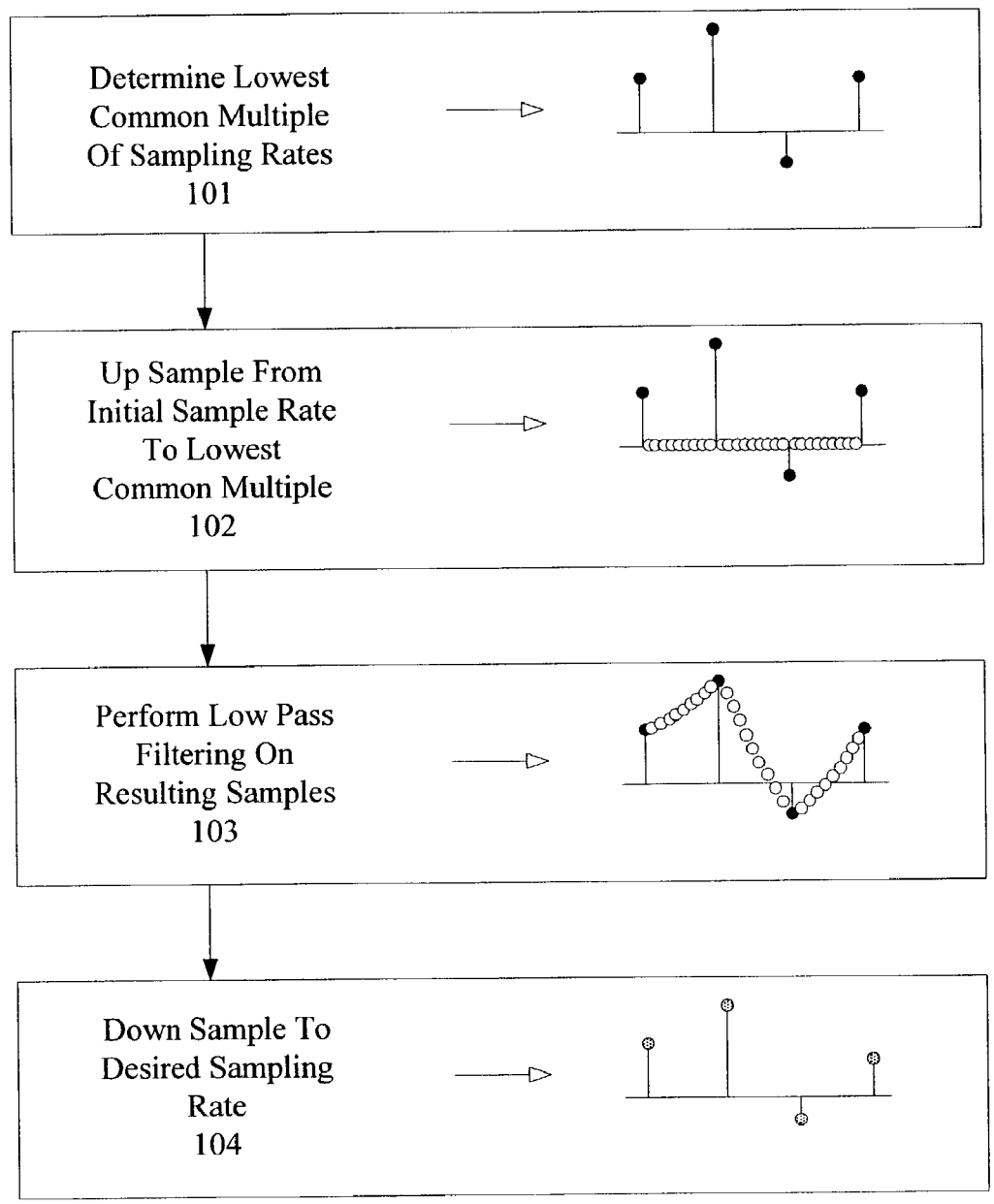
FIG. 1 illustrates a conventional non-integer fractional rate interpolator.

A conventional non-integer fractional rate interpolator 200 shown in FIG. 1 determines the lowest common multiple of the beginning (i.e. 11 MHz) and ending (i.e. 40 MHz) sampling rates in step 101. In this case, the lowest common multiple of 11 MHz and 40 MHz is 440 (11×40) MHz. At this point, an up sample would typically be performed from 44 MHz to 440 MHz in step 102 (i.e. an up sample of 10). In this up sample step, nine zeros are added between each pair of samples at 44 MHz. In this manner, 10 samples are provided for every 1 original sample. Therefore, the filter is now running at 440 MHz. A low pass filtering operation can then be performed on the resulting samples in step 103. This filtering creates a smooth transition between the original samples using the newly added zero samples. Then, a down sample would be performed from 440 MHz to 40 MHz in step 104 (i.e. a down sample of 11). In this case, every 11$^{th}$ sample is chosen and the other samples can be discarded. This conventional interpolator, although providing an accurate solution, requires system operation at 440 MHz. This high clock rate has an associated high power consumption, which renders this interpolation structure commercially impractical for WLAN applications.

Figure 2:
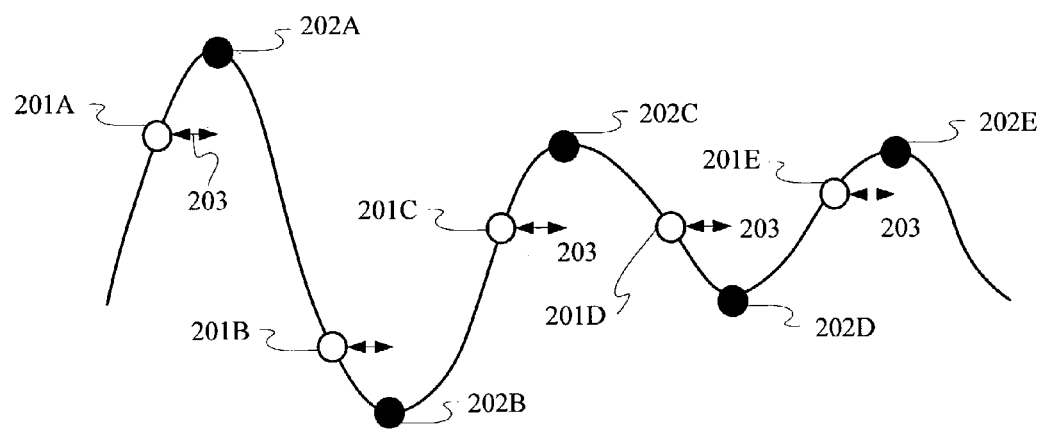
FIG. 2 illustrates a waveform in which certain samples are received although other samples should be analyzed. In this case, an interpolator could be used to sample at the same rate, but using a time offset for each of the original samples to ensure ideal (i.e. highest/lowest value) samples are analyzed.

Note that other interpolators can provide offsets without actually changing the sampling rate. For example, FIG. 2 illustrates a waveform in which samples 201A–201E are received although preferably samples 202A–202E would be analyzed. In this case, an interpolator could be used to sample at the same rate, but using a time offset 203 for each of samples 201A–201E to ensure ideal (i.e. highest/lowest value) 202A–202E samples are analyzed. However, of importance, this type of interpolator fails to provide the necessary sampling conversion of 44 MHz to 40 MHz for OFDM packets.

Figure 3:
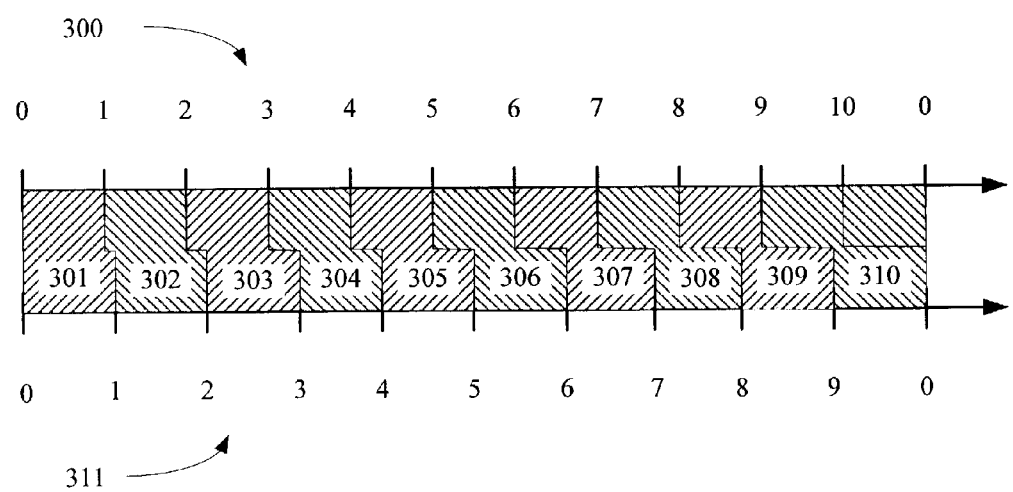
FIG. 3 illustrates the variable offsets that should be applied to a plurality of sample inputs (top row received at 44 MHz) to ensure the sample outputs (bottom row) are provided at the appropriate rate (e.g. 40 MHz).

In accordance with one embodiment of the invention, ten interpolators (i.e. one for each phase of the desired output) could be used to provide the desired sampling. For example, referring to FIG. 3, ten interpolators could be used to provide predetermined delays to received samples 300 (i.e. 0, 1, 2, 3, 4, 5, 6, 7, 8, 9, 10, 0) at 44 MHz so that output samples 511 (i.e. 0, 1, 2, 3, 4, 5, 6, 7, 8, 9, 0) can be slowed to the desired sampling of 40 MHz. For example, a first interpolator could provide an interpolated offset 501 of 0.1 samples for sample 1, a second interpolator could provide an interpolated offset 502 of 0.2 samples for sample 2, a third interpolator could provide an interpolated offset 503 of 0.3 samples for sample 3, and so forth. Note that the long delay of received sample 9 effectively lines up received sample 0 (second instance) and output sample 0 (also second instance). Thus, sampling can continue with sample 0 (effectively sample 11) of received samples 300.

In accordance with one feature of the invention, selecting appropriate coefficients for taps in the interpolator can generate the desired offsets (i.e. 0.1–0.9). Of interest, the interpolator for an interpolated offset of 0.1 has the same taps as an interpolator for an offset phase of 0.9 with the order of the taps reversed. Similarly, interpolators for interpolated offsets of 0.2, 0.3, and 0.4 have the same taps as interpolators for offset phases of 0.8, 0.7, and 0.6, respectively, with the order of the taps reversed. Therefore, in one embodiment, five sets of interpolator coefficients could provide the desired offsets. (Note that any received sample 0 requires no offset.) This reduction technique is discussed in an article entitled, "The Effects of Quantizing The Fractional Interval In Interpolation Filters" by Jussi Vesma et al., published by Tampere University of Technology.

Figure 4:
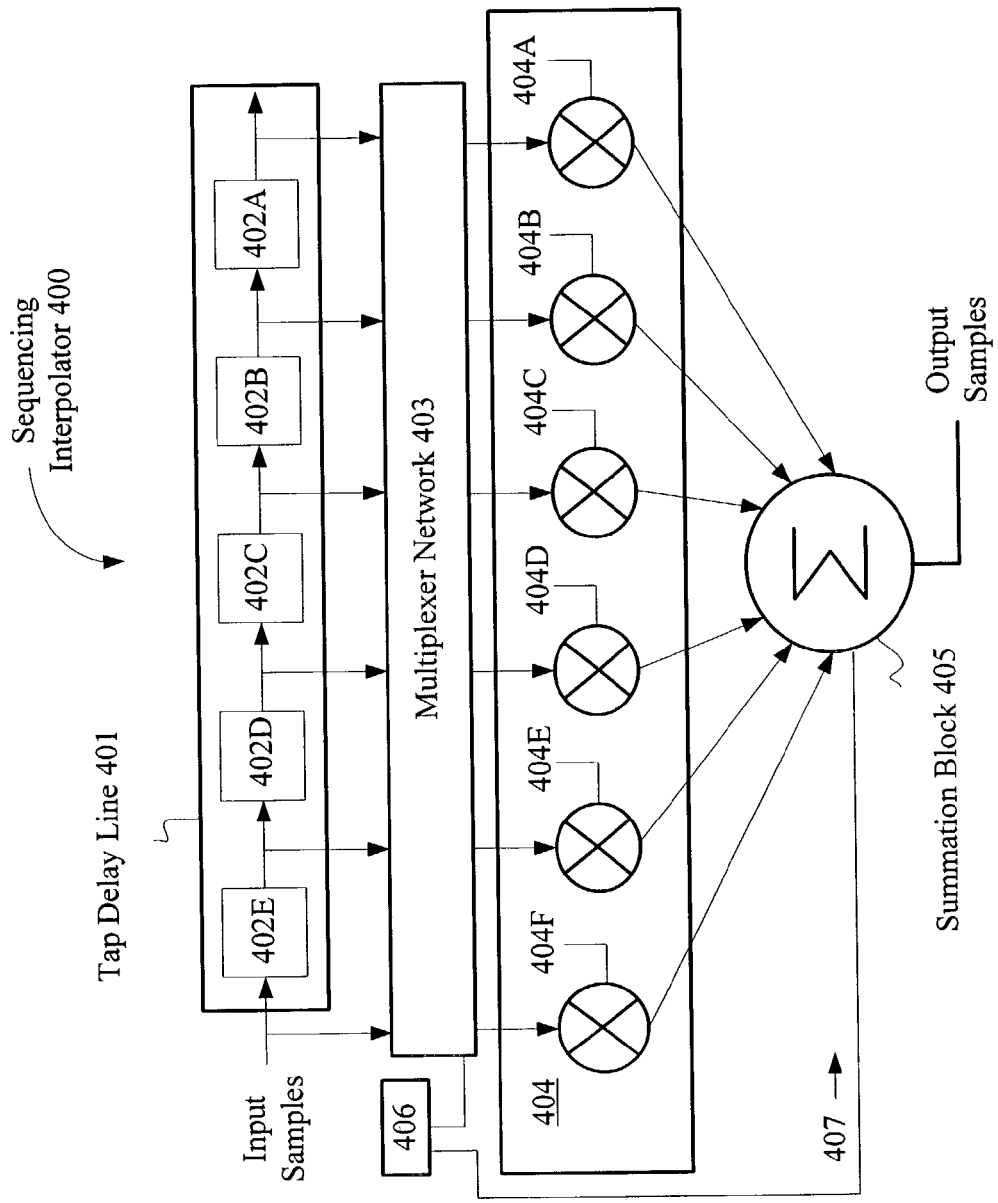
FIG. 4 illustrates an exemplary sequencing interpolator that can provide a desired sampling conversion in an 802.11g WLAN device operating with a reduced number of phase locked loops (PLLs).

FIG. 4 illustrates an exemplary interpolator 400 that can provide the necessary sampling conversion from 44 MHz to 40 MHz by sequencing through interpolator stages. In sequencing interpolator 400, a tap delay line 401 can be loaded with five samples. In general, tap delay line 401 can be implemented as a FIFO (first in first out) device, wherein each sample can be clocked through N storage devices 402 (e.g. flip-flops 402A–402E). Computing an approximate value of N based on a desired signal to noise ratio (SNR) is discussed in pages 511–513 of "Digital Communication Receivers" by Heinrich Meyr et al., published by John Wiley & Sons, Inc. in 1998. Note that the value of N can be adjusted based on the actual multiplier coefficients used and minimum-mean squared error (MMSE) for interpolator stages (both described below), thereby optimizing sequencing interpolator 400.

After loading of tap delay line 401, each sample (including the sample stored at the input of storage element 402E) is multiplied by one of coefficients 404A–404F at a tap in multiplier network 404. These products are then summed using a summation block 405. Multiplexer network 403 advantageously provides optimal flexibility for pairing certain samples with the appropriate coefficients 404A–404F in multiplier network 404. For example, one multiply-accumulate computation could pair the sample of storage device 402B with a first coefficient, whereas another multiply-accumulate computation could pair the same sample with a second coefficient different than the first coefficient.

Figure 6:
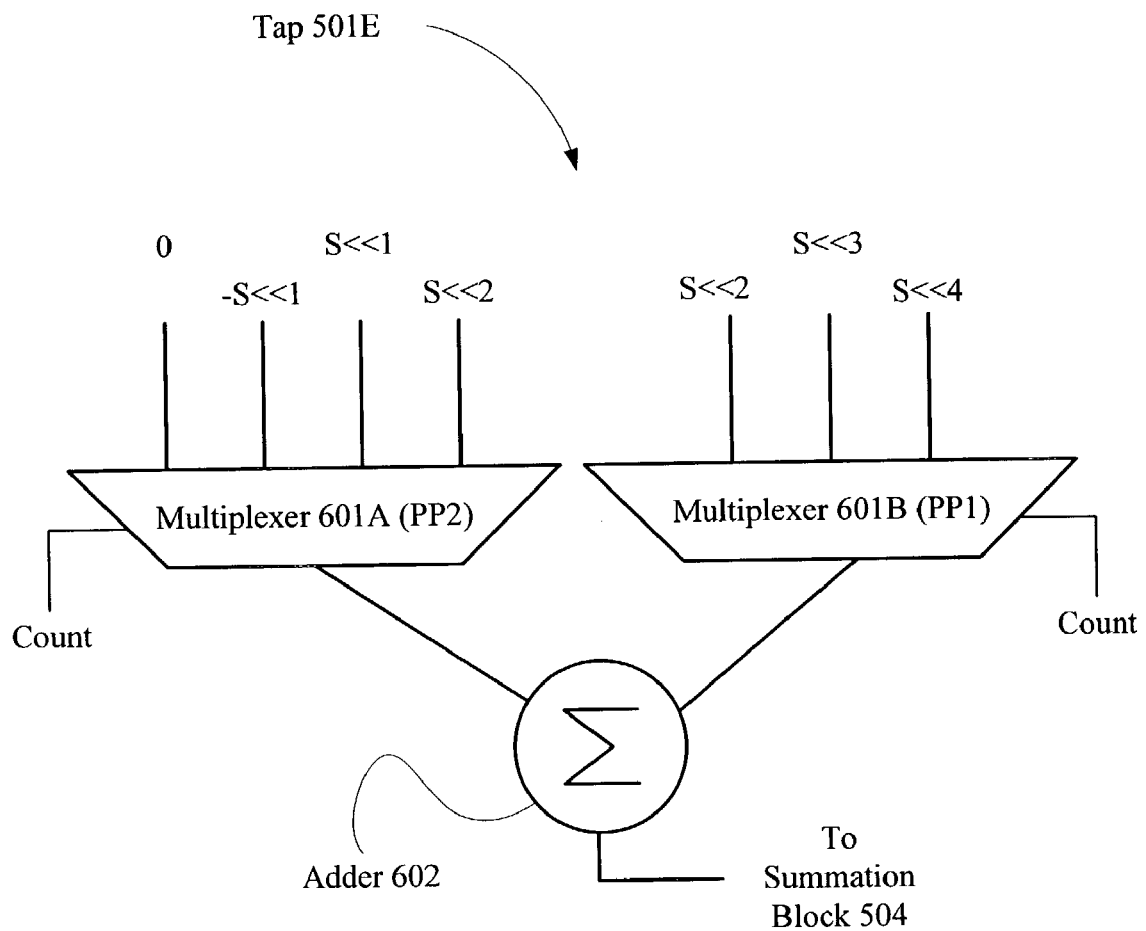
FIG. 6 illustrates an exemplary tap of the multiplexed partial product network of FIG. 5.

In one embodiment, a counter 406 that counts from 1 to 10 (e.g. a four bit counter) can control the multiplexers of multiplexer network 403, wherein each count selects a predetermined coefficient (explained in further detail in reference to FIG. 6). Thus, sequencing interpolator 400 can function as multiple, i.e. 10, discrete time filters. Each configuration of sequencing interpolator 400 during a count is an interpolator stage. When counter 406 reaches 10, it can output a predetermined signal 407 that indicates the next output sample (i.e. the 11$^{th}$ sample) generated by summation block 405 will not be used.

In one embodiment, multiplexer network 403 and multiplier network 404 can be implemented using partial products. For example, instead of implementing S×17, wherein S is a sample, a partial product of S+(S×16) could be computed. A partial product computation can be more efficient than a simple multiplication because the S×16 product could be used more often (i.e. in different interpolator stages) than S×17 (see Table 1, for example), thereby advantageously reducing the overall number of components needed to generate the coefficients for sequencing interpolator 400. Note that integer values can be represented by a shift of binary bits. Specifically, <<n represents a left shift by n bits. Thus, the integer 1 can be represented by <<0, the integer 2 can be represented by <<1, the integer 4 can be represented by <<2, the integer 8 can be represented by <<3, the integer 16 can be represented by <<4, etc.

Figure 5:
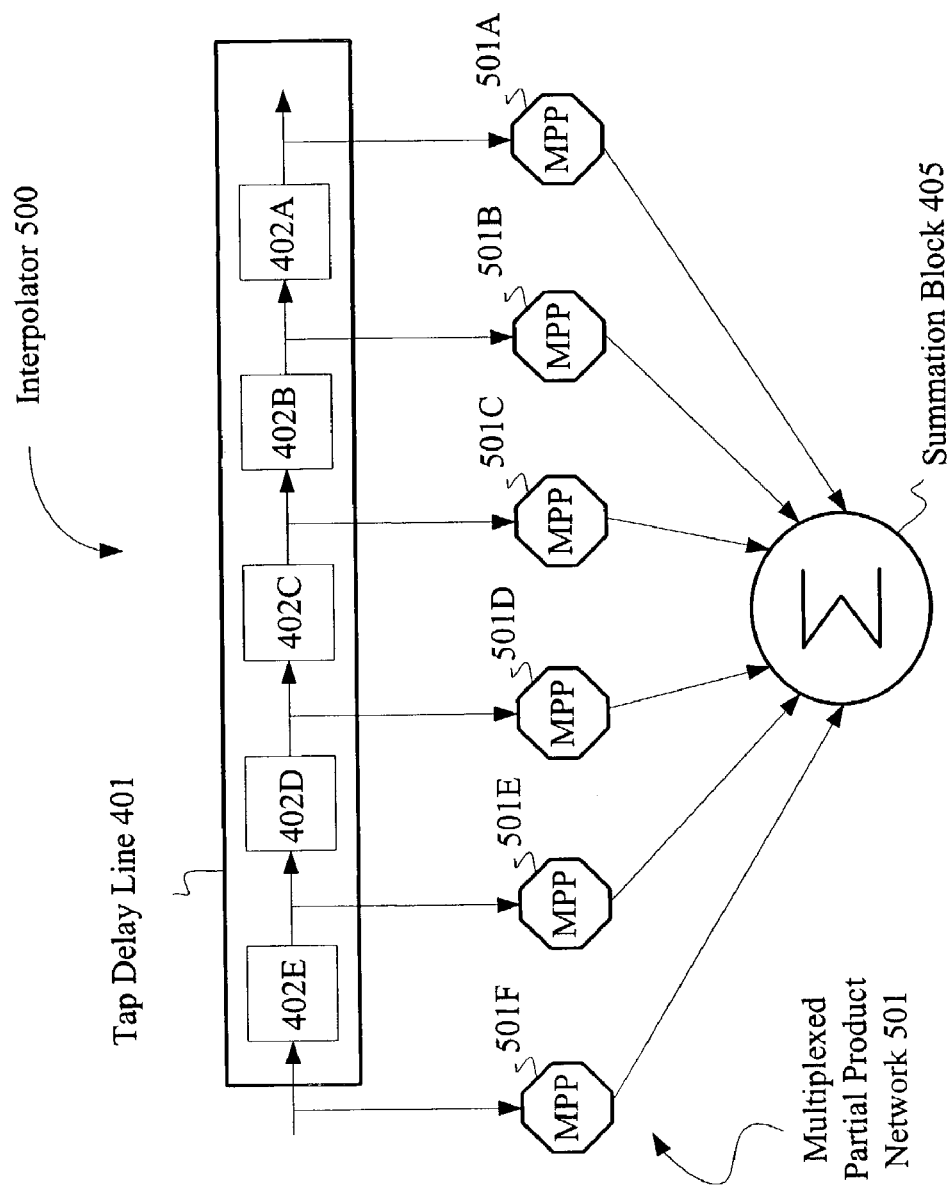
FIG. 5 illustrates another exemplary sequencing interpolator that can provide the desired sampling conversion using a multiplexed partial product network.

FIG. 5 illustrates an exemplary sequencing interpolator 500 that replaces multiplexer network 403 and multiplier network 404 with a multiplexed partial product network 501. Multiplexed partial product network 501 includes five taps 501A–501E. FIG. 6 illustrates an exemplary tap 501E that can be implemented using two multiplexers 601A–601B and an adder 602. In tap 501E, multiplexers 601A–601B receive inputs based on its current sample S. Multiplexer 601A selects a particular partial product input (generically PP2) based on a counter value (called the "count"). Similarly, multiplexer 601B selects a particular partial product input (generically PP1) based on the same count. An adder 602, which can represent multiple adders, adds the selected partial products PP1 and PP2 from multiplexers 601B and 601A, respectively. In one embodiment, the implementation of adders 602 and 405 can be generated by a synthesis tool, such as the Module Compiler from Synopsys, Inc. This synthesis tool uses a carry save technique to optimize the summation function.

Table 1 indicates an illustrative embodiment for tap 501E for each count, i.e. the desired coefficient for that count and exemplary implementation details to generate the desired coefficient.

TABLE 1

ILLUSTRATIVE TAP IMPLEMENTATION

| Count | Coefficient | Implementation PP1 +/− PP2 |
|---|---|---|
| 1 | 7 | 8(<<3) − 1(<<0) |
| 2 | 12 | 8(<<3) + 4(<<2) |
| 3 | 16 | 16(<<4) + 0 |
| 4 | 18 | 16(<<4) + 2(<<1) |
| 5 | 18 | 16(<<4) + 2(<<1) |
| 6 | 17 | 16(<<4) + 1(<<0) |
| 7 | 15 | 16(<<4) − 1(<<0) |
| 8 | 12 | 8(<<3) + 4(<<2) |
| 9 | 8 | 8(<<3) + 0 |
| 10 | 4 | 4(<<2) + 0 |

Note that various bit shifts can be used for different counts. For example, bit shift <<3 can be used for counts 1, 8, and 9 in multiplexer 601B. This consolidation of bit shifts can advantageously reduce the components necessary to generate the desired coefficients. In one embodiment, two multiplexers 601 can be provided for each tap in the sequencing interpolator. However, the implemented taps can use the same bit shift inputs as shown in FIG. 6 or different bit shift inputs based on the desired coefficients for counts 1–10. Moreover, the number of multiplexers used can be based on the desired coefficient value and precision.

In accordance with one feature of the invention, coefficient values can be chosen to ensure linearity between adjacent output samples from summation block 405 (FIGS. 4 and 5). Specifically, adjacent samples are effectively passed through different (i.e. mathematically different) interpolators because different coefficients can be used for each tap of the sequencing interpolator at each count. Because each interpolator stage (that is, the sequencing interpolator with selected coefficients for one count) has distinct frequency response characteristics in magnitude or phase, a non-linearity in the interpolated waveform can be created between output samples. In other words, the operation of each interpolator stage can be non-ideal by some amount.

Therefore, in accordance with one feature of the invention, a total minimum-mean squared error (MMSE) can be computed based on the known signal to noise ratio (SNR) desired for the WLAN device. At this point, a noise contribution for each noise source, including each of the interpolator stages, can be determined, thereby effectively setting an error "budget" for each interpolator stage. The tap coefficients for each interpolator stage can then be chosen to minimize the error from a perfect interpolator for an equal distribution of passband frequencies. During this selection, an MMSE computation, typically using real and imaginary values, can be performed for each interpolator stage to ensure it falls within the specified tolerance. In this manner, irrespective of non-linearities between adjacent output samples, the total error in the frequency domain within the passband is assured to be within a given tolerance. (Note that the stopband is not analyzed because this area is not of concern.)

Exemplary code, written in MATLAB (a common mathematical language), for implementing a sequencing interpolator as well as the code to optimize the coefficients is now provided for illustration purposes. (Note that this code does not simulate the partial-product based interpolator or other parts of the structure. However, the code is bit-accurate to that embodiment.) In accordance with one feature of the invention, using a pseudo-inverse to find the MMSE solution can optimize the coefficients of the sequencing interpolator.

```
% make_interp_vec.m
% script used to generate MMSE interpolator coefficients
%
% Perform MMSE filter creation via the following equations:
% The following function, i.e. the filter frequency response,
      should be minimized:
% integral (−2 pi B:2 pi B){(exp(j w Ts mu) − . . .
% sum(n=−I1:I2) {h[n]exp(−j w Ts n)})^2}
% where: integral is the ideal response, w is the phase (2f), Ts
      is the sampling frequency, mu is the fractional delay (0.1,
      0.2, etc.), B is the bandwidth, and sum is the actual frequency
      response
% This can be done by examining many w values w0, and creating an
% over-defined matrix equation Xh = y, where:
% X is an MxN matrix of rotating exponentials for DFT computation
      of h
% h is the desired vector for a given mu
% y is the desired frequency domain value for a given w0
%        M is the number of frequency values to examine
%        N is the number of taps in the filter
% We can then compute the MMSE value for h via:
%        h = pinv(X) * y
N = 8; %Number of taps
M = 1001; %Number of frequency points to check (using large
      number of points is easier than computing with a continuous
      integral)
rx = 0;
if rx
    BW = 9/44; %Given single sided bandwidth / sampling rate
    mu_vec = [.1 .2 .3 .4 .5]; % Fractional sample to advance
else
    BW = 9/40; %Given single sided bandwidth / sampling rate
    mu_vec = [1/11 2/11 3/11 4/11 5/11]; % Fractional sample to
advance
end
quantize = 0;
quant_bits = 7;
for mu = mu_vec
    Nvec = −N/2:N/2−1; % N is number of taps
    X=zeros(2*M+1,N);
    for index=1:2*M+1
% Create ideal vector
        w0 = (index−M−1) / (M) * BW * 2 * pi;
        X(index,:) = exp(−1i * w0 .* Nvec);
    end
%Use pseudo-inverse to find best MMSE interpolator
    y = exp(1i * linspace(−BW, BW, 2*M+1) * 2 * pi .* mu).';
    h = real(pinv(X) * y );
    fprintf('Filter for mu = %6.4f\n',mu);
    if quantize
        format short
        h = round(h * 2^quant_bits)
    else
        format long
        h
    end
end
%%%%%%%%%%%%%%%%%%%%%%%%%%%%%%%%%%%%%%
%%% Name    : rx_interp.m
%%% Purpose : Receiver interpolator structure for 802.11g
%%%            Converts from 44 MHz to 40 MHz
%%%%%%%%%%%%%%%%%%%%%%%%%%%%%%%%%%%%%%
function out = rx_interp (in,params);
    % Substitute when fixed point model ready
    use_fp_model = 0;
    % Show figures of interpolation
    show_figures = 0;
%Find ideal floating point taps (i.e. coefficients)
    if use_fp_model
        % Initialize filters
        filt0 = [0 0 0 0 1 0 0 0];
        filt1 = [−.00196 .01091 −.03599 .10792 .96819
            −.06157 .01481
            . . . −.00240];
        filt2 = [−.00376 .02118 −.07127 .22795 .90965
```

```
                    -.10614 .02662
                    . . . -.00439];
            filt3 = [-.00526 .02990 -.10281 .35522 .82755
                    -.13381 .03480
                    . . . -.00582];
            filt4 = [-.00630 .03622 -.12758 .48438 .72600
                    -.14545 .03908
                    . . . -.00663];
            filt5 = [-.00678 .03946 -.14266 .60984 .60984
                    -.14266 .03946
                    . . . -.00678];
            in1 = in;
%Find quantized floating point taps in integers (i.e.
    coefficients)
        else
            filt0 = [0 0 0 0 128 0 0 0];
            filt1 = [0 1 -4 14 123 -7 1 0];
            filt2 = [0 2 -8 29 115 -12 2 0];
            filt3 = [0 2 -12 46 105 -15 2 0];
            filt4 = [0 2 -15 61 92 -16 4 0];
            filt5 = [0 4 -16 76 76 -16 4 0];
            in1=in/8;
        end
%Make 0.6 – 0.9 delay interpolators
    filt6=fliplr(filt4);
    filt7=fliplr(filt3);
    filt8=fliplr(filt2);
    filt9=fliplr(filt1);
%Filter input with all interpolators
    out0=conv(in1,filt0);
    out1=conv(in1,filt1);
    out2=conv(in1,filt2);
    out3=conv(in1,filt3);
    out4=conv(in1,filt4);
    out5=conv(in1,filt5);
    out6=conv(in1,filt6);
    out7=conv(in1,filt7);
    out8=conv(in1,filt8);
    out9=conv(in1,filt9);
%Choose correct filtered output for ideal choice of mu (i.e.
instead of running a different interpolator at each sampling
point, input is run through all interpolators to determine best
interpolator)
    if (0)
        out=[ ];
        for i=0:floor((length(in)-9)/11)
            i11 = i*11;
            out = [out . . .
                    out0(i11+6) . . .
                    out1(i11+7) . . .
                    out2(i11+8) . . .
                    out3(i11+9) . . .
                    out4(i11+10) . . .
                    out5(i11+11) . . .
                    out6(i11+12) . . .
                    out7(i11+13) . . .
                    out8(i11+14) . . .
                    out9(i11+15)];
        end
    else % to remove the for-loop, WJC, 10/17/02
        Ns = floor((length(in)-9)/11);
        out_tmp = [out0(6:11:11*Ns+6); . . .
                    out1(7:11:11*Ns+7); . . .
                    out2(8:11:11*Ns+8); . . .
                    out3(9:11:11*Ns+9); . . .
                    out4(10:11:11*Ns+10); . . .
                    out5(11:11:11*Ns+11); . . .
                    out6(12:11:11*Ns+12); . . .
                    out7(13:11:11*Ns+13); . . .
                    out8(14:11:11*Ns+14); . . .
                    out9(15:11:11*Ns+15)];
        out = reshape (out_tmp, 1, prod(size(out_tmp)));
    end
%Check computations
    if (0) % just test
    % check if both implementations are same or not
    if isequal (out,out2)
        fprintf (1,'two implementations in rx_interp are same\n')
    else
        error('two implementations are not equivalent in
            rx_interp\n')
    end
end
% Quantize out to ADC output values
    if use_fp_model
        out = saturation (round(out),256*8);
    else
        out = saturation(floor(out/16+0.5+0.5i),256*8); floor drops
            LSBs, saturate out MSBs
    end
%Print output
    if show_figures
        figure(1)
        clf
        hold on
        psd(in,2048,44e6)
        psd(out,2048,40e6)
        figure(2)
        clf
        plot (real(out))
        hold on
        plot (real(resample(in(7:end),10,11)),'r')
        figure(4);psd(resample(in,10,11,10))
    end
%%%%%%%%%%%%%%%%%%%%%%%%%%%%%%%%%%%%%
%% Name     : tx_interp.m
%% Purpose  : Transmitter interpolator structure for 802.11g
%%              Converts from 40 MHz to 44 MHz
%%%%%%%%%%%%%%%%%%%%%%%%%%%%%%%%%%%%%
function out = tx_interp(in);
    % Substitute when fixed point model ready
    use_fp_model = 1;
    % Show figures of interpolation
    show_figures = 0;
%Find ideal floating point taps (i.e. coefficients)
    if use_fp_model
% Initialize filters
    filt0 = [0 0 0 0 1 0 0 0];
    filt1 = [ -0.00146829481856 0.00906014446191
            -0.03171766834449 0.09737897194633 0.97115288240108
            -0.05504875193986 0.01242649782772 -0.00181765426884];
    filt2 = [ -0.00284152607157 0.01769213363283
            -0.06304281016311 0.20494388732203 0.92030529169635
            -0.09636727670195 0.02259974834117 -0.00335358164280];
    filt3 = [ -0.00402087196301 0.02527332694133
            -0.09179993554821 0.31914295582077 0.84976766025265
            -0.12401486890575 0.03008823533490 -0.00452525500312];
    filt4 = [ -0.00491753302646 0.03121968778787
            -0.11578586197789 0.43609064272421 0.76246973569618
            -0.13856083366959 0.03465655747194 -0.00527850590172];
    filt5 = [ -0.00545791489469 0.03501817630485
            -0.13285989448990 0.55170390483427 0.66184543876714
            -0.14103409448039 0.03625756165818 -0.00558825677733];
%Find quantized floating point taps in integers (i.e.
    coefficients)
filt0 =[0 0 0 0 128 0 0 0];
filt1 =[0 1 -4 12 124 -7 2 0];
filt2 =[0 2 -8 26 118 -12 2 0];
filt3 =[0 2 -12 41 109 -16 4 0];
filt4 =[0 4 -15 56 97 -18 4 0];
filt5 =[0 4 -17 70 85 -18 4 0];
    filt6=fliplr(filt5);
    filt7=fliplr(filt4);
    filt8=fliplr(filt3);
    filt9=fliplr(filt2);
    filt10=fliplr(filt1);
    out0=conv(in,filt0);
    out1=conv(in,filt1);
    out2=conv(in,filt2);
    out3=conv(in,filt3);
    out4=conv(in,filt4);
    out5=conv(in,filt5);
    out6=conv(in,filt6);
    out7=conv(in,filt7);
    out8=conv(in,filt8);
    out9=conv(in,filt9);
    out10=conv(in,filt10);
%Choose correct filtered output for ideal choice of mu (i.e.
```

```
instead of running a different interpolator at each sampling
point, input is run through all interpolators to determine best
interpolator)
    if (0)
        out=[ ];
        for i=0:floor(length(in)/10)-1+floor(mod(length(in),10)/7)
            i11 = i*10;
            out = [out . . .
                ([out0(i11+5) . . .
                    out10(i11+5) . . .
                    out9(i11+6) . . .
                    out8(i11+7) . . .
                    out7(i11+8) . . .
                    out6(i11+9) . . .
                    out5(i11+10) . . .
                    out4(i11+11) . . .
                    out3(i11+12) . . .
                    out2(i11+13) . . .
                    out1(i11+14)])];
        end
    else % to remove the for-loop
        Ns = floor(length(in)/10)-1+floor(mod(length(in),10)/7);
        i11 = Ns*10; % for later use
        out_tmp = [out0(5:10:10*Ns+5);. . .
            out10(5:10:10*Ns+5);. . .
            out9(6:10:10*Ns+6);. . .
            out8(7:10:10*Ns+7);. . .
            out7(8:10:10*Ns+8);. . .
            out6(9:10:10*Ns+9);. . .
            out5(10:10:10*Ns+10);. . .
            out4(11:10:10*Ns+11);. . .
            out3(12:10:10*Ns+12);. . .
            out2(13:10 :10*Ns+13);. . .
            out1(14:10:10*NS+14)];
        out = reshape (out_tmp,1,prod(size(out_tmp)));
    end
%Check computations
    if (0) % just test
        % check if both implementations are same or not
        if isequal (out, out_new)
            fprintf (1,'two implementations in tx_interp are same\n')
        else
            error ('two implemenations are not equivalent in
                tx_interp\n')
        end
    end
%Adjust bit accuracy for shutdown
    switch mod(length(in),10)
        case 1
            out = [out out0(i11+15) out10(i11+15) out9
                (i11+16) out8(i11+17) out7(i11+18)];
        case 2
            out = [out out0(i11+15) out10(i11+15) out9
                (i11+16) out8(i11+17) out7(i11+18) out6
                (i11+19)];
        case 3
            out = [out out0(i11+15) out10(i11+15) out9
                (i11+16) out8(i11+17) out7(i11+18)
                out6(i11+19) out5(i11+20)];
        case 4
            out = [out out0(i11+15) out10(i11+15)
                out9(i11+16) out8(i11+17) out7(i11+18)
                out6(i11+19) out5(i11+20) out4(i11+21)];
        case 5
            out = [out out0(i11+15) out10(i11+15)
                out9(i11+16) out8(i11+17) out7(i11+18)
                out6(i11+19) out5(i11+20) out4(i11+21)
                out3(i11+22)];
        case 6
            out = [out out0(i11+15) out10(i11+15)
                out9(i11+16) out8(i11+17) out7(i11+18)
                out6(i11+19) out5(i11+20) out4(i11+21)
                out3(i11+22) out2(i11+23)];
        case 7
            out = [out out0(i11+15) out10(i11+15)
                out9(i11+16) out8(i11+17) out7(i11+18)
                out6(i11+19) out5(i11+20) out4(i11+21)
                out3(i11+22) out2(i11+23) out1(i11+24)];
        case 9
            out = [out out0(i11+15) out10(i11+15)
                out9(i11+16) out8(i11+17)];
        case 0
            out = [out out0(i11+15) out10(i11+15)
                out9(i11+16)];
    end
end
% Quantize out to ADC output values
    out = saturation(floor(out/128+0.5+0.5i),256*8);
%Print output
    if show_figures
        figure (1)
        clf
        hold on
        psd(in,2048,44e6)
        psd(out,2048,40e6)
        figure(2)
        clf
        plot (real(out))
        hold on
        plot (real(resample(in(7:end),11,10)),'r')
        figure(4);psd(resample(in,11,10,11))
    end
```

Although illustrative embodiments have been described in detail herein with reference to the accompanying figures, it is to be understood that the invention is not limited to those precise embodiments. They are not intended to be exhaustive or to limit the invention to the precise forms disclosed. As such, many modifications and variations will be apparent to practitioners skilled in this art.

Figure 7A:
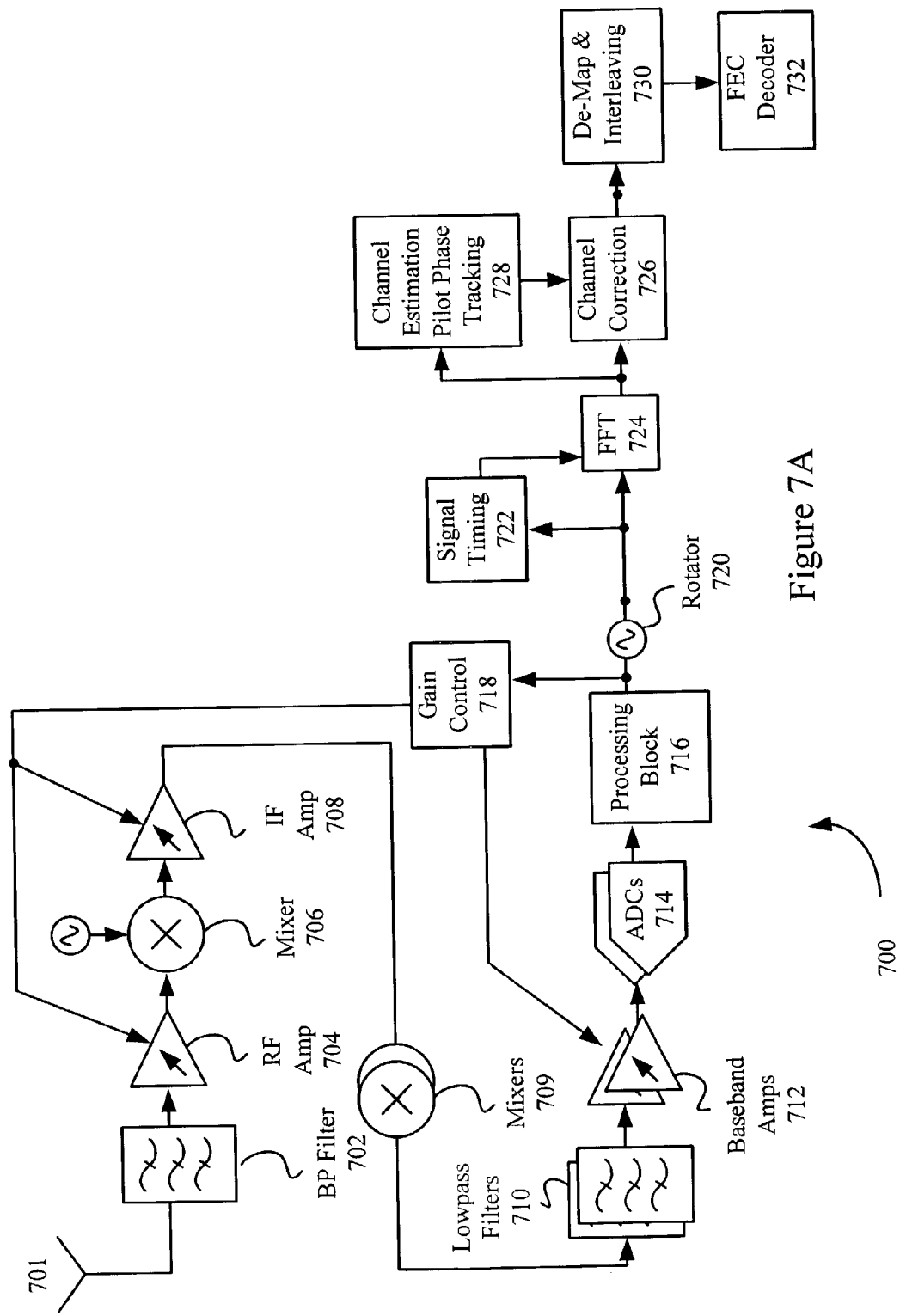
FIG. 7A illustrates a simplified receiver of a WLAN device, wherein the components of the receiver can operate using a single phase locked loop.

For example, the sequencing interpolator can be used in a receiver as well as a transmitter of an 802.11g device. FIG. 7A illustrates a simplified receiver 700 that can include a sequencing interpolator. In receiver 700, a bandpass filter 702 receives the incoming signals from an antenna 701 and outputs a predetermined band of frequencies (while excluding those frequencies higher and lower than the predetermined band). A variable RF amplifier 704 can provide an initial amplification to that predetermined band of frequencies. A mixer 706 converts those amplified signals into intermediate frequency (IF) signals, which are then amplified by an IF amplifier 708. At this point, mixers 709 and low pass filters 710 (including both I and Q branches) can generate signals in the desired channel (called the baseband signals). Amplifiers 712 then amplify these baseband signals. At this point, analog to digital converters 714 (provided for both the I and Q branches of low pass filters 710) transform the amplified baseband signals into digital signals that can be analyzed by a processing block 716, which includes a sequencing interpolator (described in reference to FIG. 7B).

A rotator 720 receives the output of processing block 716 and provides a frequency offset correction, if necessary. Gain control circuit 718 detects the magnitude of the processed signal and uses the detected magnitude to adjust the gains of RF amplifier 702, IF amplifier 708, and BB amplifiers 712. A signal timing circuit 722, which also receives the output of processing block 716 and rotator 720, determines those intervals during which an actual symbol exists, rather than a guard interval, and provides a timing output to an FFT 724. In this manner, FFT 724 can be gated in time to receive the signal data, rather than noise caused by interference that will exist during a guard interval. Note that the gating of FFT 724 is also used to discard/add output samples based on the count (see FIG. 6). FFT 724 provides its output to a channel estimation/pilot phase tracking circuit 728 as well as a channel correction circuit 726.

Channel estimation/pilot phase tracking circuit 728 can obtain a channel estimate during the long training symbol sequence, and provide that channel estimate to channel correction circuit 726. Channel correction circuit 726 can then use the channel estimate to compensate for the determined channel characteristics for the rest of the packet. And, if included, a pilot phase tracker will adjust the channel estimate based upon channel information obtained by tracking pilot tones during the transmission of the rest of the packet. The channel corrected signal is then provided to a demapping/interleaving circuit 730 as well as an FEC decoder 732 (typically a Viterbi decoder) for decoding in a conventional manner. (Note that FFT 724 is typically needed for the processing of OFDM signals. However, other embodiments of the invention can include other means for providing this processing function.)

Figure 7B:
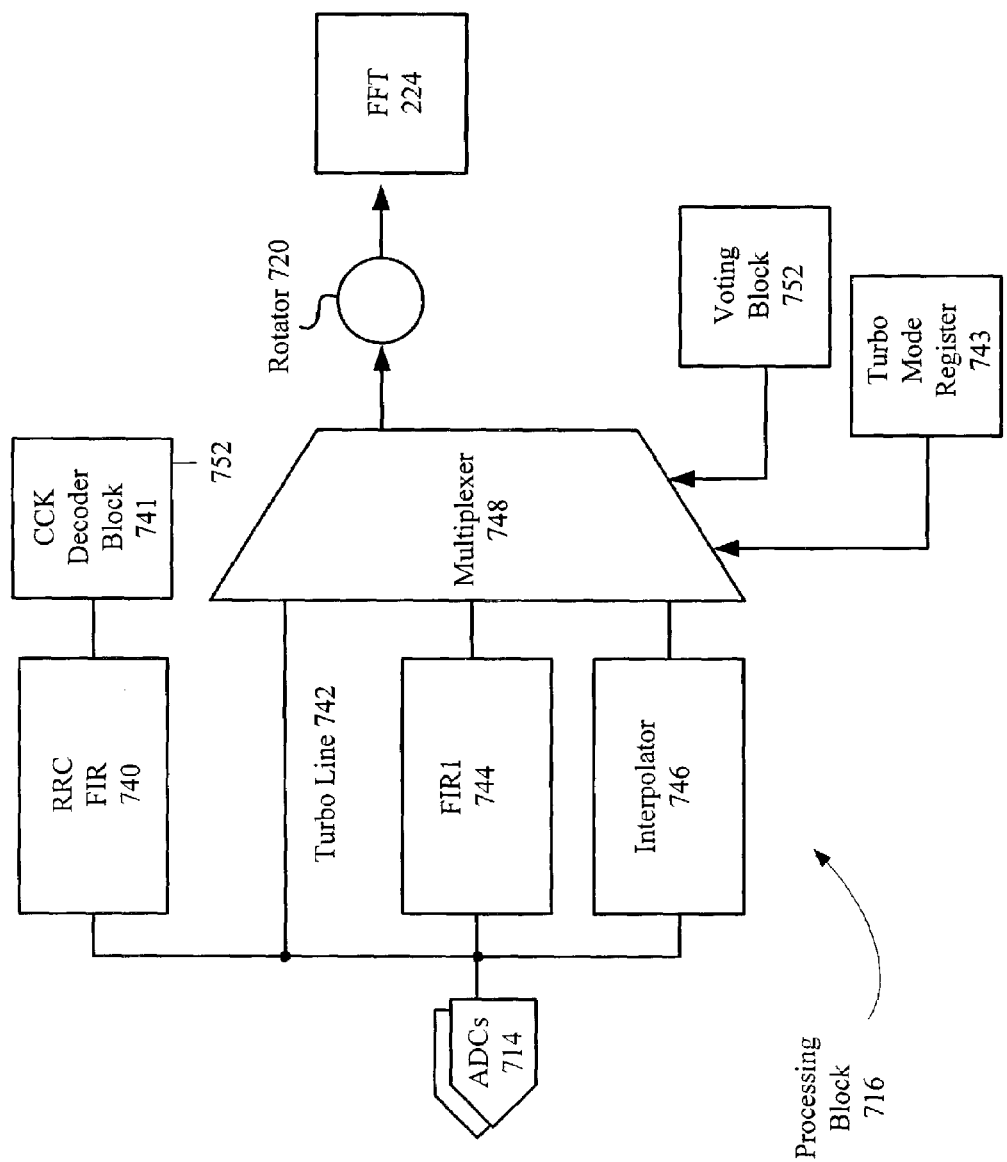
FIG. 7B illustrates a more detailed block diagram of a processing block for the receiver. This processing block includes a sequencing interpolator.

FIG. 7B illustrates processing block 716 in greater detail. For context, ADCs 714 and FFT 724 are shown. In processing block 716, a multiplexer 748 receives inputs from a root-raised cosine (RRC) FIR filter 740, a Turbo signal line 742, a finite impulse response (FIR 1) filter 744, and an interpolator 746. Multiplexer 748 can be controlled by the output generated by a voting block 752, which chooses the most likely modulation based on the analysis of different modulation correlators.

Filter 740 can be used when a CCK modulation type is identified, the received data rate is identified to be 44 MHz, and the desired data rate is identified to be 22 MHz. If used, filter 740 ensures that the subsequent signals are correctly converted from 44 MHz to the desired 22 MHz and then provided to a CCK decoder block 741 (note that if a CCK signal is identified in voting, then CCK decoder block 741 is activated, otherwise it is turned off for the duration of the packet). Turbo signal line 742 can be selected (by a signal from a turbo mode register 743) when an OFDM modulation type is identified and the data rate received and desired is 80 MHz (i.e. twice as fast as a standard 802.11a signal). Filter 744 can be selected when an OFDM modulation type is identified, the received data rate is identified to be 80, and the desired data rate is identified to be 40 MHz. Interpolator 746 can be selected when an OFDM modulation type is identified, the received data rate is identified to be 44, and the desired data rate is identified to be 40 MHz. Interpolator 603 can be implemented using sequencing interpolator configurations described in reference to FIGS. 4, 5, and/or 6, for example.

The processed signals selected by multiplexer 748 can then be provided to rotator 720. Rotator 720 can provide its output to FFT 724, which along with the other components in receiver 700 (shown in FIG. 7A), operate to accurately reconstruct the received signals.

Figure 8:
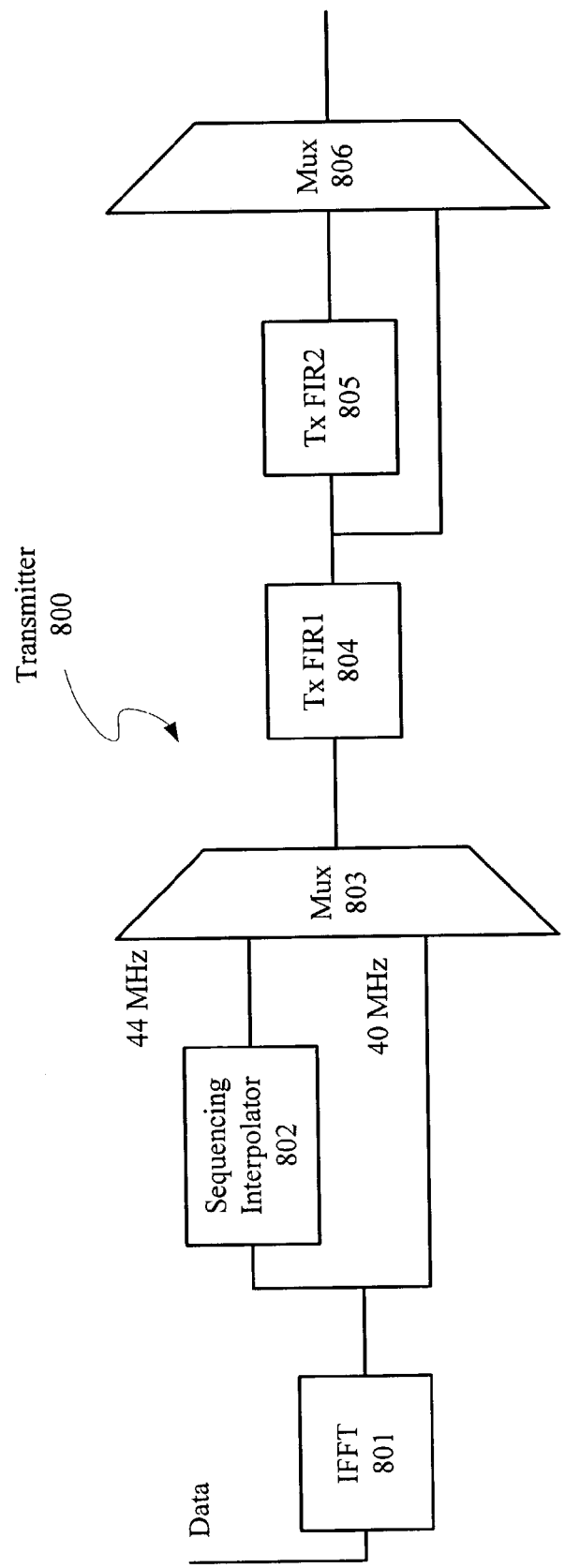
FIG. 8 illustrates a simplified transmitter of a WLAN device, wherein the transmitter can include a sequencing interpolator.

FIG. 8 illustrates a simplified transmitter 800 that includes a sequencing interpolator. In transmitter 800, an Inverse Fast Fourier Transform (IFFT) 801 can receive data to be transmitted. (Note that IFFT 801 is typically needed for the processing of OFDM signals. However, other embodiments of the invention can include other means for providing this processing function.) This data can be provided at 40 MHz, for example. Sequencing interpolator 802 can increase the sampling rate from 40 MHz to 44 MHz by essentially reversing the above-described conversion process. A multiplexer 803 can determine whether data at the 40 MHz rate or at the 44 MHz rate is selected for transmission. In one embodiment, if transmission is performed in an 802.11g environment, then the data at the 44 MHz rate is selected. Otherwise, the data at the 40 MHz rate is selected. At this point, a first transmission filter, i.e. Tx FIR1 804, performs an up sample of 2 on the selected data, thereby effectively doubling the clock rate of the data selected by multiplexer 803. In a similar manner, a second transmission filter, i.e. Tx FIR2 805, performs another up sample of 2 on the selected data, thereby effectively quadrupoling the clock rate of the data selected by multiplexer 803. Thus, if multiplexer 803 selects data at 44 MHz, then a multiplexer 806 receives data at 176 MHz and 88 MHz. In contrast, if multiplexer 803 selects data at 40 MHz, then multiplexer 806 receives data at 160 MHz and 80 MHz. In one embodiment, a WLAN device can be in a Turbo mode (effectively 802.11a signals at twice the rate). In this case, IFFT 801 processes data at 80 MHz, multiplexer 803 selects the non-interpolated input (i.e. the data at 80 MHz), and multiplexer 806 selects the doubled output of Tx FIR1 804 at 160 MHz. In this manner, the system for receipt and transmission of OFDM signals can advantageously use a single PLL to provide its desired clock rates. The above-described MATLAB code can be used to compute the coefficients of transmitter 800 and to provide a model of an architecture-independent implementation.

A transceiver, which provides both receiving and transmitting functions in a WLAN device, can also include a sequencing interpolator. The transceiver can include a receiver block and a transmitter block (for example, receiver 700 shown in FIG. 7A and transmitter 800 shown in FIG. 8). The receiver block can receive system input signals at a first clock rate and provide output signals to one or more digital components of the transceiver at a second clock rate. The transmitter block can receive input signals from one or more digital components of the transceiver at the second clock rate and provide system output signals at the first clock rate. Of importance, the receiver block and the transmitter block can share the sequencing interpolator that converts the first clock rate to the second clock rate and vice versa.

Note that although the 802.11a environment operates in the 5.0 GHz band and the 802.11g environment operates in the 2.4 GHz, an 802.11a OFDM packet is substantially identical to an 802.11g OFDM packet. Thus, when mixed to baseband, these packets are substantially the same.

Of importance, although described in reference to 802.119 WLAN devices, the sequencing interpolator is equally applicable to any system that would benefit from converting a plurality of samples from a first clock rate to a second clock rate, wherein the first clock rate divided by the second clock rate is a rational ratio. Accordingly, it is intended that the scope of the invention be defined by the following claims and their equivalents.

What is claimed is:

1. A method of converting a plurality of samples received or transmitted by a system from an input sampling rate to an output sampling rate, the method comprising:
   selectively processing the plurality of samples based on their modulation type;
   if interpolation is desired as determined by selectively processing, then using a plurality of interpolators for receiving the plurality of samples;
   for each interpolator, applying different predetermined coefficients to the plurality of samples;
   sequencing through the plurality of interpolators based on a count; and
   at an end of the count,
       if the output sampling rate is less than the input sampling rate, then discarding an interpolated sample at the output sampling rate, and
       if the input sampling rate is less than the output sampling rate, then adding an interpolated sample at the output sampling rate.

2. The method of claim 1, wherein a phase locked loop for the system can provide a first sampling rate but not simultaneously a second sampling rate.

3. The method of claim 2, wherein adjacent samples are processed by different interpolators.

4. The method of claim 3, further including using a minimum-mean squared error (MMSE) technique to determine the predetermined coefficients for the plurality of interpolators.

5. The method of claim 3, wherein the predetermined coefficients for each interpolator ensure that an error in a frequency domain is within a given tolerance.

6. The method of claim 1, wherein the system is a wireless local area network (WLAN).

7. The method of claim 1, wherein applying different predetermined coefficients includes selecting predetermined partial products based on the plurality of samples.

8. A sequencing interpolator for converting samples having a first rate into samples having a second rate, the sequencing interpolator comprising:
a tap delay line for storing a plurality of samples;
a multiplier network for multiplying each of the plurality of samples by a coefficient;
a multiplexer network for selectively determining which coefficient is applied to a sample; and
a summation block for summing products of the multiplier network, wherein the multiplexer network and the multiplier network are implemented by a multiplexed partial product network, wherein if a counter value reaches a predetermined value, then an output sample of the summation block is discarded.

9. The sequencing interpolator of claim 8, wherein the multiplexed partial product network includes sets of multiplexers, wherein each set of multiplexers receives a plurality of bit shift values based on one of the plurality of samples.

10. The sequencing interpolator of claim 9, wherein each set of multiplexers provides partial product outputs to an adder, wherein the adder provides an output sum to the summation block.

11. The sequencing interpolator of claim 10, wherein all sets of multiplexers are controlled by a counter value.

12. A method for reducing a number of phase locked loops (PLLs) in a receiver or a transmitter, the method comprising:
receiving samples at a first clock rate;
providing a predetermined number of different offsets to the received samples, thereby generating output samples at a second clock rate; and
if the second clock rate is less than the first clock rate, then discarding every Nth output sample, and if the first clock rate is less than the second clock rate, then adding an interpolated sample to every Nth output sample wherein providing a predetermined number of different offsets further includes:
choosing the predetermined coefficients by using a minimum-mean squared error (MMSE) technique to reduce non-linearities between adjacent output samples.

13. A method for reducing a number of phase locked loops (PLLs) in a receiver or a transmitter, the method comprising:
receiving samples at a first clock rate;
providing a predetermined number of different offsets to the received samples, thereby generating output samples at a second clock rate; and
if the second clock rate is less than the first clock rate, then discarding every Nth output sample, and if the first clock rate is less than the second clock rate, then adding an interpolated sample to every Nth output sample wherein providing a predetermined number of different offsets includes:
performing a partial products computation based on each of the received samples.

14. The method of claim 13, wherein performing a partial products computation includes:
bit shifting to provide a plurality of partial products for each received sample; and
determining which partial products are summed.

15. A method of reducing non-linearities in adjacent output samples provided by a plurality of interpolators, the method comprising:
using a minimum-mean squared error (MMSE) technique to choose predetermined coefficients for the plurality of interpolators, wherein predetermined sets of coefficients are used for each delay provided by an interpolator, and wherein the predetermined coefficients for each interpolator ensure that an error in a frequency domain is within a given tolerance.

16. A receiver or a transmitter for a wireless local area network (WLAN) device, the receiver or transmitter comprising:
means for receiving data samples at a first rate;
a sequencing interpolator for receiving processed data samples from the means for receiving, converting the processed data samples to interpolated data samples at a second rate, and one of discarding and adding predetermined interpolated data samples at the second rate based on a count; and
means for selecting one of the processed data samples at the first frequency and the interpolated data samples at the second rate based on modulation type, thereby outputting processed signals.

17. The receiver or the transmitter of claim 16, wherein the sequencing interpolator includes:
a tap delay line for storing a plurality of the data samples;
a multiplier network for multiplying each of the plurality of data samples by a coefficient;
a multiplexer network for selectively determining which coefficient is applied to a data sample; and
a summation block for summing products of the multiplier network.

18. The receiver or the transmitter of claim 17, wherein the multiplexer network is controlled by the count.

19. The receiver or the transmitter of claim 17, wherein the multiplexer network and the multiplier network are implemented by a multiplexed partial product network.

20. The receiver or the transmitter of claim 19, wherein the multiplexed partial product network includes sets of multiplexers, wherein each set of multiplexers receives a plurality of bit shift values based on one of the plurality of data samples.

21. The receiver or the transmitter of claim 20, wherein each set of multiplexers provides partial product outputs to an adder, wherein the adder provides an output sum to the summation block.

22. The receiver or the transmitter of claim 21, wherein the sets of multiplexers are controlled by the count.

23. The receiver or the transmitter of claim 16, wherein the receiver further comprises:
variable gain amplifiers for amplifying radio signals;
means for mixing the radio signals to provide baseband frequencies;

analog to digital converters for receiving the baseband frequencies and outputting data samples; and means for decoding the processed signals.

24. The receiver or the transmitter of claim 23, wherein the means for selecting includes:
   at least one other signal manipulation component; and
   a multiplexer for selectively choosing the sequencing interpolator or another signal manipulation component.

25. A wireless local area network (WLAN) device comprising:
   a first block for receiving input signals at a first clock rate and providing output signals to at least one digital component of the WLAN device at a second clock rate;
   a second block for receiving input signals from the at least one digital component of the WLAN device at the second clock rate and providing output signals at the first clock rate,
   wherein at least one of the first block and the second block includes a sequencing interpolator that can convert the first clock rate to the second clock rate and vice versa; and
   a processing block for selectively processing the input signals based on their modulation type.

26. The WLAN device of claim 25, wherein the first block and the second block share a sequencing interpolator.

* * * * *

UNITED STATES PATENT AND TRADEMARK OFFICE
CERTIFICATE OF CORRECTION

PATENT NO. : 7,098,821 B2  Page 1 of 1
APPLICATION NO. : 10/367527
DATED : August 29, 2006
INVENTOR(S) : Paul J. Husted et al.

It is certified that error appears in the above-identified patent and that said Letters Patent is hereby corrected as shown below:

Title page, item (56)    References Cited    OTHER PUBLICATIONS, insert

-- Hentschel et al. "Sample Rate Conversion in Software Radio Terminals", Dresden University of Technology, Mobile Communications Systems Chair, Date Unknown, 6 pages
Mar et al. "A High-Quality,Energy Optimized, Real-Time Sampling Rate-Conversion Library for the StrongARM Microprocessor", HP Laboratories, Palo Alto, CA, June 3, 2002, 12 pages
"Rate-Converter Product Specification", Multirate Filter Cores, rf engines limited, http://www.rfel.com, May 26, 2004, 6 pages --.

Signed and Sealed this

Nineteenth Day of December, 2006

JON W. DUDAS
*Director of the United States Patent and Trademark Office*